United States Patent
Wiesmann et al.

(10) Patent No.: US 10,350,962 B2
(45) Date of Patent: Jul. 16, 2019

(54) ASSEMBLY FOR AIR DISTRIBUTION FOR AN AIR CONDITIONING SYSTEM OF AN AUTOMOBILE

(71) Applicant: Hanon Systems, Daejeon (KR)

(72) Inventors: Ralph Wiesmann, Euskirchen (DE); Torsten Klein, Troisdorf (DE); Antonio Marques Ferreira, Konigswinter (DE)

(73) Assignee: HANON SYSTEMS, Daejeon (KR)

( * ) Notice: Subject to any disclaimer, the term of this patent is extended or adjusted under 35 U.S.C. 154(b) by 414 days.

(21) Appl. No.: 15/180,239

(22) Filed: Jun. 13, 2016

(65) Prior Publication Data
US 2016/0361969 A1    Dec. 15, 2016

(51) Int. Cl.
*B60H 1/34* (2006.01)
*B60H 1/00* (2006.01)

(52) U.S. Cl.
CPC ....... *B60H 1/00685* (2013.01); *B60H 1/0005* (2013.01); *B60H 1/00064* (2013.01); *B60H 1/00842* (2013.01); *B60H 2001/00707* (2013.01); *B60H 2001/00721* (2013.01)

(58) Field of Classification Search
CPC .................................................. B60H 1/00685
USPC ................ 454/160, 125, 126, 153, 141, 150
See application file for complete search history.

(56) References Cited

U.S. PATENT DOCUMENTS

| | | | | |
|---|---|---|---|---|
| 3,090,291 A | * | 5/1963 | Herbon | B60H 1/00685 454/148 |
| 5,220,944 A | * | 6/1993 | Burnett | B60H 1/00678 137/625.44 |
| 5,350,335 A | * | 9/1994 | Andersson | B60H 1/00685 454/121 |
| 5,391,112 A | * | 2/1995 | Wardlaw | B60H 1/00685 454/139 |
| 5,476,418 A | * | 12/1995 | Loup | B60H 1/00678 454/121 |
| 5,676,595 A | * | 10/1997 | Sumiya | B60H 1/00042 454/121 |
| 5,836,813 A | * | 11/1998 | Miyata | B60H 1/00685 454/139 |

(Continued)

FOREIGN PATENT DOCUMENTS

| | | |
|---|---|---|
| DE | 19603126 A1 | 8/1996 |
| EP | 1336517 A1 | 8/2003 |

(Continued)

*Primary Examiner* — Steven B McAllister
*Assistant Examiner* — Samantha A Probst
(74) *Attorney, Agent, or Firm* — Shumaker, Loop & Kendrick, LLP; James D. Miller

(57) ABSTRACT

An arrangement for the air distribution of an air conditioning system (1) of a motor vehicle. The air conditioning system (1) is configured with a housing (2) with at least two flow paths (6, 7), which empty into a mixing chamber (8), and at least one air outlet (3a, 3b, 3c) as well as an air flap (10, 11, 12) which can open and close the at least one air outlet (3a, 3b, 3c). The arrangement has a device (18) for air mixing with at least one air resistance element (21), which is supported so that it can turn about an axis of rotation (20) and which extends in the direction of the axis of rotation (20). The air resistance element (21) is configured with at least one flow through opening, so that depending on the position of the device (18) a cross section of at least one flow path (6, 7) of the housing (2) can be changed.

7 Claims, 3 Drawing Sheets

(56) References Cited

U.S. PATENT DOCUMENTS

| | | | | |
|---|---|---|---|---|
| 5,921,527 A * | 7/1999 | Ikawa | B60H 1/00685 251/129.03 |
| 6,224,480 B1 * | 5/2001 | Le | B60H 1/00692 454/156 |
| 6,520,850 B1 * | 2/2003 | Buckman | B60H 1/00678 137/338 |
| 6,695,691 B1 * | 2/2004 | Le | B60H 1/00678 454/121 |
| 6,814,137 B2 * | 11/2004 | Tsurushima | B60H 1/00064 165/103 |
| 7,585,209 B2 * | 9/2009 | Kiel | B60H 1/00685 454/143 |
| 7,775,451 B2 * | 8/2010 | Leoni | B60H 1/00671 236/13 |
| 8,376,819 B2 * | 2/2013 | Vincent | B60H 1/00028 165/42 |
| 8,840,452 B2 * | 9/2014 | Han | B60H 1/00692 454/145 |
| 2003/0042011 A1 * | 3/2003 | Vincent | B60H 1/00064 165/203 |
| 2003/0054751 A1 * | 3/2003 | Parekh | B60H 1/00678 454/121 |
| 2004/0043720 A1 * | 3/2004 | Uemura | B60H 1/00692 454/156 |
| 2005/0142999 A1 * | 6/2005 | Uemura | B60H 1/00692 454/152 |
| 2006/0154592 A1 * | 7/2006 | Wawzyniak | B60H 1/00685 454/121 |
| 2009/0023374 A1 * | 1/2009 | Suzuki | B60H 1/00692 454/126 |
| 2009/0197517 A1 * | 8/2009 | Wang | B60H 1/00692 454/145 |
| 2009/0250193 A1 | 10/2009 | Ishikawa | |
| 2010/0144263 A1 * | 6/2010 | Han | B60H 1/00678 454/155 |
| 2015/0038067 A1 * | 2/2015 | Byon | B60H 1/00021 454/160 |
| 2017/0320372 A1 * | 11/2017 | Aizawa | B60H 1/00521 |

FOREIGN PATENT DOCUMENTS

| | | |
|---|---|---|
| JP | 2000052745 A | 2/2000 |
| JP | 2004268712 A | 9/2004 |
| JP | 2007131280 A | 5/2007 |
| JP | 2009006857 A | 1/2009 |
| JP | 2009035070 A | 2/2009 |

* cited by examiner

ASSEMBLY FOR AIR DISTRIBUTION FOR AN AIR CONDITIONING SYSTEM OF AN AUTOMOBILE

CROSS-REFERENCE TO RELATED PATENT APPLICATION

This application claims priority to DE Patent Application No. 102015109354.5 filed on Jun. 12, 2015, the disclosure of which is incorporated herein by reference in its entirety.

FIELD OF THE INVENTION

The invention concerns an arrangement for the air distribution of an air conditioning system of a motor vehicle with an air mixing device with at least one air resistance element. The air resistance element is supported so that it can turn about an axis of rotation and has a configuration extending in the direction of the axis of rotation. Furthermore, the invention concerns an air conditioning system for a motor vehicle with means of delivering, cooling and heating of air. The air conditioning system has a housing with air outlets and at least two flow paths, which empty into a mixing chamber, as well as an air distribution arrangement.

BACKGROUND OF THE INVENTION

In the case of motor vehicles, due to the increasing number of technical components, an optimization in terms of the design volume is required in order to ensure the desired array of functions by the placement of the components. For this reason, large-volume air conditioning components such as are familiar from stationary climate control systems in the form of mixing chambers, flow baffles and swirling devices, also cannot be used in motor vehicles on account of the tight space conditions.

An additional requirement for a climate control system of a motor vehicle which conditions a supplied air mass flow, possibly breaking it up and directing the individual air mass flows into different regions of the vehicle, is to provide air mass flows of different temperature to different air outlets of the climate control system depending on their location and function. The supplied air mass flow is taken through different heat exchangers, so that the air is cooled down and dehumidified, and if necessary reheated, before being taken to the passenger space. For example, the air is blown into the foot space as well as through openings in the dashboard into the passenger space and furthermore it is taken directly to the windshield via outlets, in order to keep it free of condensation or to defrost it.

In air conditioning systems of this kind with regulation at the air side, the air mass flow being supplied to the passenger space is divided by means of a flap, also known as the temperature flap, into two partial air mass flows. The required temperatures of the air flow volumes are adjusted by means of the temperature flaps and various regulating mechanisms. One partial air mass flow is taken through a heating heat exchanger situated in the lower region of the system and heated. At the same time, the second partial air mass flow flows as cold air bypassing the heating heat exchanger. The two partial air mass flows of different temperature are then mixed to achieve the desired target temperature.

In traditional air conditioning systems the partial air mass flows are not completely mixed. Different temperatures occur at the different air outlets into the passenger space in intermediate positions of the temperature flap. The differing temperatures of the air mass flows at the different outlets, such as foot space, dashboard, and windshield ventilation, are known as temperature stratification.

To decrease the stratification between given outlets, warm air ducts are provided, for example, especially to direct warm air toward the windshield outlet, which on the one hand detract from the air flow and the acoustics, being an additional element, and on the other hand cause higher costs.

Other known air conditioning systems have a temperature flap in connection with an enlarged mixing zone, which is configured so as to take the cold air mass flow in the direction of the warm air mass flow and take the air mass flows through the enlarged mixing zone for an adequate mixing. The quality of the mixing is achieved here through the size of the mixing zone.

Alternatively or additionally, the air conditioning systems especially in the area of the mixing zone are configured with deflectors or baffles as narrowing elements or throttling elements in order to generate turbulence within the air mass flows being mixed. With the additional plates narrowing the flow cross section for the air mass flow, the flow velocity is increased. As a drawback, the pressure loss equally increases.

It is likewise known from the prior art how to design the air conditioning system so that the warm air mass flow and the cold air mass flow are taken to strike against each other frontally and then mix, for a better blending.

Other designs of traditional systems have baffles, which block the different air mass flows at certain positions as needed within the system, obstruct the passageway and thus prevent the air from flowing through.

The deflectors, baffles, narrowing elements or throttling elements are fashioned for example at the temperature flap itself.

There are also known in the prior art systems with more than two flow paths for the air, in which the air has different temperatures within the flow paths.

From EP 1 336 517 A1 there is known a climate control system with an evaporator arranged in an air duct and a heating heat exchanger arranged thereafter in the flow direction of the air. The air mass flow conditioned in the evaporator can then be divided into three different flow paths, one flow path being the warm air duct and taking the air through the heating heat exchanger and the other two flow paths being cold air ducts or bypasses and taking the air past the heating heat exchanger. The different flow paths serve to avoid a strong stratification and thus improve the temperature distribution in the air mass flow.

However, the climate control system with the sliding flaps and/or rotating flaps as well as the associated driving technology has a very complicated control system for the air mass flows through or past the heating heat exchanger. Furthermore, the climate control system is designed with a plurality of mixing chambers and requires a large installation space.

There are alternatives known from the prior art to the design of climate control systems with a plurality of sliding flaps and/or rotating flaps and the associated driving technology.

Thus, from DE 196 03 126 A1 there is known a motor vehicle climate control system for the selective opening of at least three outlets. The climate control system comprises, besides a housing, a rotating shaft which is mounted to rotate in the housing and an arched rotating slide which is connected to the rotating shaft. The rotating slide has a plurality of openings and a driving means for turning the shaft. The housing is designed with a plurality of ducts leading to the outlets, whose entrance openings are arranged along the peripheral surface of the rotating slide. By means of the rotating slide, the entrance openings of the ducts are opened and/or closed, so that the air flow arriving with uniform temperature from a mixing chamber is divided up among several ducts.

It is characteristic of the systems known in the prior art that they either have additional elements which are very costly in terms of hardware, and which furthermore require additional space, costs, as well as additional installation expense, and which entail a corresponding maintenance expense. Moreover, the additional installations produce restriction and narrowing of the flow ducts and thus cause increased pressure losses in the air flow, which in turn leads to an increased power demand and thus energy consumption, as well as lower efficiency of the air conditioning system and thus of the entire motor vehicle.

Moreover, the flap geometries known in the prior art besides the definite flow losses also produce loud flow noises. Vibrations can be produced by the swinging of the flaps.

SUMMARY OF THE INVENTION

The problem which the present invention proposes to solve is to provide a climate system having an optimal mixing as needed, with the least possible stratification in terms of the temperatures of the air mass flow, as well as minimal expense for the temperature control. In particular, an air mass flow in one of the main flow directions in which little or no blending of the air mass flows is required should be unaffected or only slightly affected and at the same time a duct of a second air mass flow should be at least partly closed. The air should be taken in targeted manner and both the number of components used and also their space requirement should be minimal. The costs incurred for fabrication, installation and maintenance should be minimal.

The problem is solved by an arrangement according to the invention for the air distribution of an air conditioning system of a motor vehicle. The air conditioning system is configured with a housing with at least two flow paths, which empty into a mixing chamber, at least one air outlet as well as an air flap which can open and close the at least one air outlet. The arrangement has a device for air mixing with at least one air resistance element, which is supported so that it can turn about an axis of rotation and which extends in the direction of the axis of rotation.

According to the concept of the invention, the air resistance element has at least one flow through opening, so that depending on the position of the device a cross section of at least one flow path of the housing can be changed. The device according to the invention is configured to be coupled via connection elements to at least one of the at least one air flap such that the position of the air resistance elements is changed with a movement of the air flap.

By connection elements is meant mechanical and/or electrical or electronic components which make possible a joint adjustment of the at least one air resistance element of the device with one of the at least one air flaps. The mechanical connection can be accomplished for example by a rotary disk with cam tracks shaped on it, which are engaged by connection pieces of the device and by the air flap, by connecting rods of various configuration, by a gearing or by an electronic control system for individual drive elements.

The air conditioning system is designed preferably to operate so that an air mass flow taken through the first flow path has a first temperature and an air mass flow taken through the second flow path has a second temperature. The first flow path is operated as a cold air path and the second flow path as a warm air path.

According to a first alternative embodiment of the invention, the air resistance element coupled by connection elements to the at least one air flap and the air flap are configured with a drive unit, especially an electrical drive unit, such as a servomotor. According to a second alternative embodiment of the invention, the air resistance element coupled by connection elements to the at least one air flap and the air flap have a common drive unit, especially an electrical drive unit, such as a servomotor. The drive unit is at least part of the connection elements.

According to one modification of the invention, the air resistance element and the air flap are coupled together such that the air resistance element is arranged in a first end position changing the cross section of the first flow path, especially the cold air path, while the at least one air flap is arranged primarily closing the corresponding air outlet, especially the dashboard air outlet. In a second end position, the air resistance element is furthermore arranged not changing the cross section of the first flow duct, while the at least one air flap is arranged primarily opening the corresponding air outlet.

The air resistance element in the first end position is advantageously arranged not changing the cross section of the second flow duct, especially the warm air path, while at least one of the air flaps, especially that of the windshield air outlet and that of a foot space air outlet, are arranged primarily opening. In the second end position the air resistance element is arranged preferably changing the cross section of the second flow duct, while the air flaps of the corresponding air outlets are arranged primarily closing the air outlets.

Advantageously, the device for air mixing has a shaft with a longitudinal axis. The longitudinal axis of the shaft corresponds to the axis of rotation of the device.

The at least one air resistance element is preferably arranged on the shaft.

According to another advantageous embodiment of the invention, the at least one air resistance element of the device for air mixing is configured by a cross section of an arc-shaped surface, especially a circular arc-shaped surface, with four side edges, oriented perpendicular to the longitudinal axis of the shaft. One of the side edges as the front side is disposed preferably directly on the shaft and rigidly joined to the shaft. The circular arc shape of the surface enables an installation space-optimized arrangement especially in connection with a rotary mounted temperature flap.

The preferably circular arc-shaped surface is curved by a constant radius about a longitudinal axis.

The arc-shaped surface of the air resistance element is furthermore advantageously configured with streamlined profiles or flow through openings as an incident flow surface for an air mass flow.

According to one alternative embodiment of the invention, the at least one air resistance element of the device for air mixing is composed of a cross section of a straight surface, with four side edges, oriented perpendicular to the longitudinal axis of the shaft. One of the side edges as the front side is disposed preferably directly on the shaft and rigidly joined to the shaft. The straight surface of the air resistance element is furthermore advantageously configured with streamlined profiles or flow through openings as an incident flow surface for an air mass flow. The straight configuration of the surface is especially provided in connection with a temperature flap designed as a sliding flap.

According to another preferred embodiment of the invention, the device has a plurality of air resistance elements. The air resistance elements are spaced apart from each other in the direction of the axis of rotation so that a free space is formed between the air resistance elements as a through flow opening for an air mass flow.

By a plurality of air resistance elements is meant a number of more than one air resistance element, that is, a number of two or more air resistance elements.

The air resistance elements are advantageously arranged flush with one another in the direction of the axis of rotation.

The problem is furthermore solved by an air conditioning system according to the invention for a motor vehicle. The air conditioning system comprises means of delivering and conditioning, especially cooling, heating and dehumidification of air, and it has a housing with air outlets and at least two flow paths. The flow paths empty into a common mixing chamber.

One air mass flow taken through the first flow path as a partial air mass flow or portion of the overall air mass flow delivered in the air conditioning system has a first temperature and a partial air mass flow taken through the second flow path has a second temperature. The air mass flows can be guided by the flow paths and the mixing chamber to the air outlets.

According to the concept of the invention, an arrangement according to the invention as described above is formed inside the mixing chamber.

According to one modification of the invention, the air resistance elements are arranged at the margin or outside of an air mass flow taken through the mixing chamber, especially a main air mass flow, depending on the position of the device of the arrangement and the axis of rotation of the device. Thanks to the formation of the device at the margin or outside of the air mass flow taken through the mixing chamber, the air mass flows delivered in particular in one of the main operating modes of the air conditioning system remain unaffected by the mixing chamber.

In the arrangement of the device with the at least one air resistance element at the margin or outside of an air mass flow taken through the mixing chamber as the main air mass flow, the air resistance for the main air mass flow is minimal and negligible.

The means for delivery of the air is preferably designed as a fan, the means for cooling of the air as an evaporator of a refrigerant circuit, and the means of heating the air as a heating heat exchanger. The fan, the evaporator and the heating heat exchanger are arranged inside the housing.

According to one advantageous configuration of the invention, the heating heat exchanger is arranged inside one of the two flow paths, especially inside the second flow path, and fills up the cross section of the flow path. The contact surfaces between the heating heat exchanger and the walls of the flow path are technically tightly closed, so that the partial air flow mass taken through the flow path is taken entirely over the heat transfer surfaces of the heating heat exchanger. The other of the two flow paths, especially the first flow path, is preferably configured as a bypass around the heating heat exchanger. The air mass flow taken through the bypass consequently does not come into contact with the heat transfer surfaces of the heating heat exchanger.

The solution according to the invention has a device with air resistance elements for the conveying and directing or at least partly blocking of cold or warm air mass flows within the air conditioning system, with the goal of optimally mixing the air mass flows. The air resistance elements serve to generate turbulence in the region of the mixing chamber.

The air resistance elements are configured, for example, as deflectors, baffles, narrowing elements, integrated flow channels or throttling elements, or combinations thereof in various numbers and arrangements. The air resistance created by the device is negligible.

The solution according to the invention has various additional benefits:
- setting of a temperature of the air mass flow by means of an arrangement for air distribution with a device for air mixing with minimum expense for the temperature control system and no additional components or installed items, such as warm air ducts,
- reduction of the installation space by minimization of the number of components,
- boosting of the efficiency of the air conditioning system, since the components which reduce the cross section of the flow paths are specifically arranged within the flow paths, and
- less temperature stratification thanks to optimal mixing of the air mass flows and thus maximum comfort for the passengers in the passenger space.

BRIEF DESCRIPTION OF THE DRAWINGS

Further details, features and benefits of the invention will emerge from the following description of sample embodiments with reference to the accompanying drawings. There are shown.

DESCRIPTION OF EMBODIMENTS OF THE INVENTION

Figure 1:
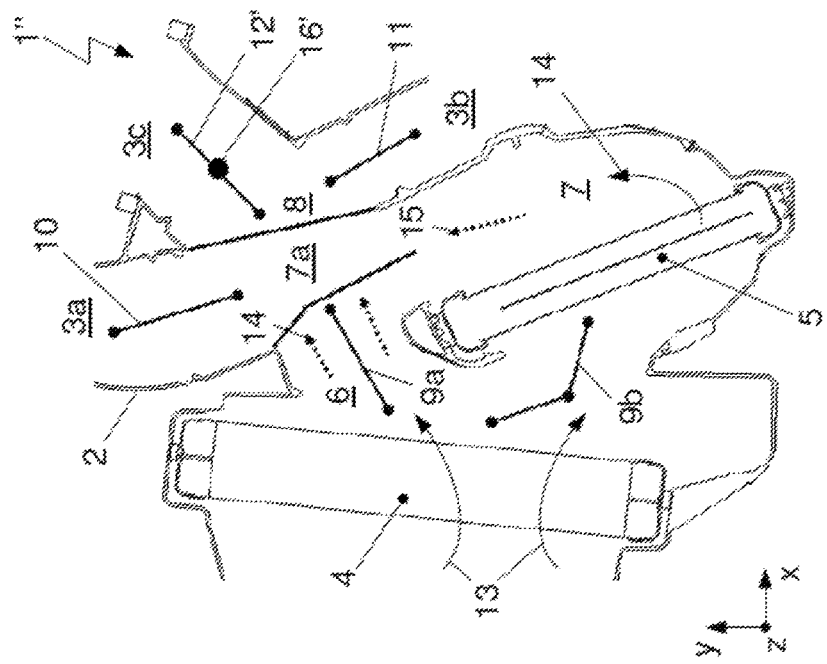
FIG. 1: an air conditioning system of a motor vehicle with air outlets and corresponding air flaps from the prior art.

FIG. 1 shows an air conditioning system 1' of the prior art. The air conditioning system 1' has a fan, not shown, for taking in and delivering air in the flow direction 13 through the housing 2 of the air conditioning system 1' with an evaporator 4 and a heating heat exchanger 5. The housing 2 comprises three air outlets 3a, 3b, 3c and a mixing chamber 8.

The air mass flow sucked in by the fan and carried away in the flow direction 13 to the evaporator 4 is entirely or proportionately conveyed across the heat transfer surfaces of the evaporator 4 and then divided into two flow paths 6, 7. The air mass flow can be conveyed at least proportionately through a bypass around the evaporator 4.

The first flow path 6, also known as the cold air path 6, takes the air cooled down and/or dehumidified in the evaporator 4 as a partial air mass flow around the heating heat exchanger 5. The first flow path 6 is situated in the vertical direction y of the air conditioning system 1' above the heating heat exchanger 5, which is arranged inside the second flow path 7. The partial air mass flow taken through the second flow path 7 is taken entirely across the heat transfer surfaces of the heating heat exchanger 5 and heated. The flow path 7 is consequently also called the warm air path 7.

The flow paths 6, 7 empty each into the mixing chamber 8. The partial air mass flows divided into the flow paths 6, 7 are again brought together in the mixing chamber 8 and mixed before the now conditioned air is taken through the individual air outlets 3*a*, 3*b*, 3*c* to the passenger space.

The air mass flow taken across the evaporator 4 is divided by means of the temperature flaps 9*a*, 9*b* into the partial air mass flows to the flow path 6, 7. By means of the position of the temperature flaps 9*a*, 9*b*, the partial air mass flows through the flow paths 6, 7, that is, the proportions of the total air mass flow through the air conditioning system 1' and thus the temperature at the air outlets 3*a*, 3*b*, 3*c* can be controlled. The temperature flap 9*a* serves for opening and closing the cold air path 6, while the temperature flap 9*b* is provided for the opening and closing of the warm air path 7.

The air outlet 3*a* for the windshield, the air outlet 3*b* for the foot space and the air outlet 3*c* for the dashboard can be closed or opened by means of the air flaps 10, 11, 12'. Per FIG. 1, the air flaps 10, 11, 12' are oriented such that the air outlets 3*a*, 3*b*, 3*c* are opened. The air outlet 3*c* is also known as the passenger or driver flow unit, since the air mass flow conveyed through the air outlet 3*c* can flow directly onto the passengers.

The air flaps 10, 11, 12', which are configured as a straight surface in cross section produced by the plane subtended in the horizontal direction x and in the vertical direction y, are each mounted to turn about an axis of rotation and extend in the depth direction z. The air flap 12' of the air outlet 3*c* for the dashboard is arranged, for example, to turn about the axis of rotation 16'.

In the arrangement represented in FIG. 1 with opened temperature flaps 9*a*, 9*b* the air mass flow is divided into the flow paths 6, 7. The first partial air mass flow taken in the flow direction 14 through the cold air path 6 and the second partial air mass flow taken in the flow direction 15 through the warm air path 7 are mixed in the mixing chamber 8 and directed through the air outlet 3*a*, 3*b*, 3*c* into the passenger space.

Figure 2:
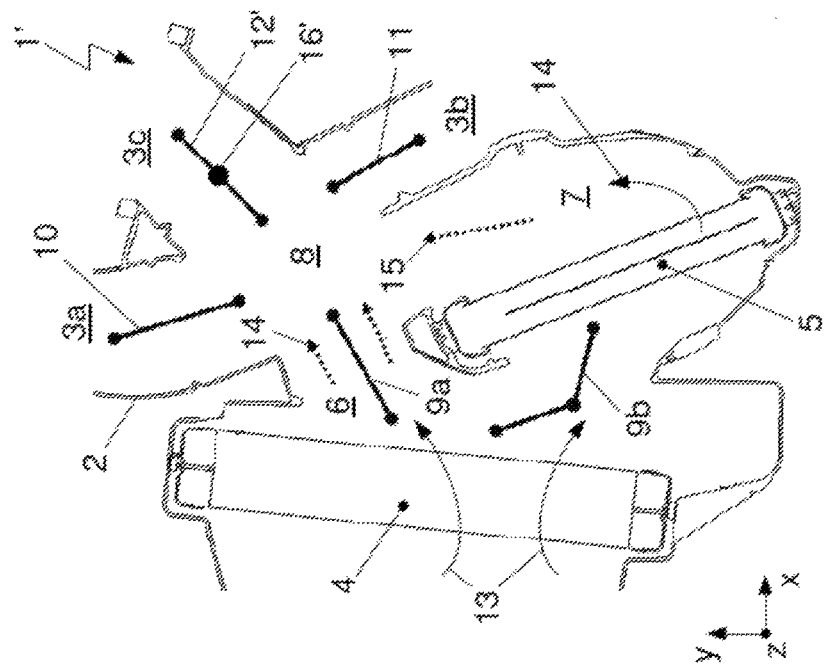
FIG. 2: an air conditioning system of a motor vehicle with air outlets and corresponding air flaps according to FIG. 1 as well as a warm air duct from the prior art.

FIG. 2 shows an air conditioning system 1" of a motor vehicle with the air outlets 3*a*, 3*b*, 3*c* and the corresponding air flaps 10, 11, 12' per FIG. 1 as well as a warm air duct 7*a* from the prior art.

The warm air duct 7*a* arranged inside the air mass flow or at the side next to the air mass flow essentially serves to convey warm air from the warm air path 7 to the air outlet 3*a* of the windshield and reduce the air stratification between the air outlets 3*a*, 3*b*, 3*c*. The warm air duct 7*a* arranged inside the mixing chamber 8 requires additional installation space and/or reduces the flow cross section for the air mass flow, so that the warm air duct 7*a* as an extra element on the one hand impairs the air throughput through the mixing chamber 8 and thus the air power, and on the other hand the acoustics. The operating efficiency of the air conditioning system 1" is decreased. Alternatively, several warm air ducts are arranged vertically distributed alongside each other, for example in the depth direction z.

Figure 3A:
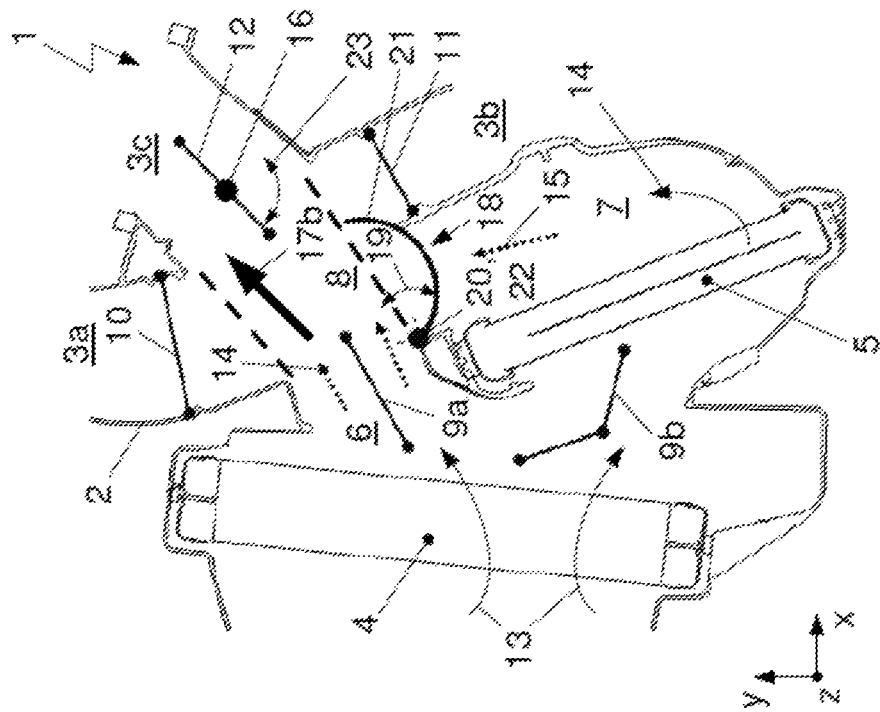
FIG. 3A, 3B: an air conditioning system of a motor vehicle with air outlets and corresponding air flaps as well as a device for air mixing each in an end position of the device.
Figure 3B:
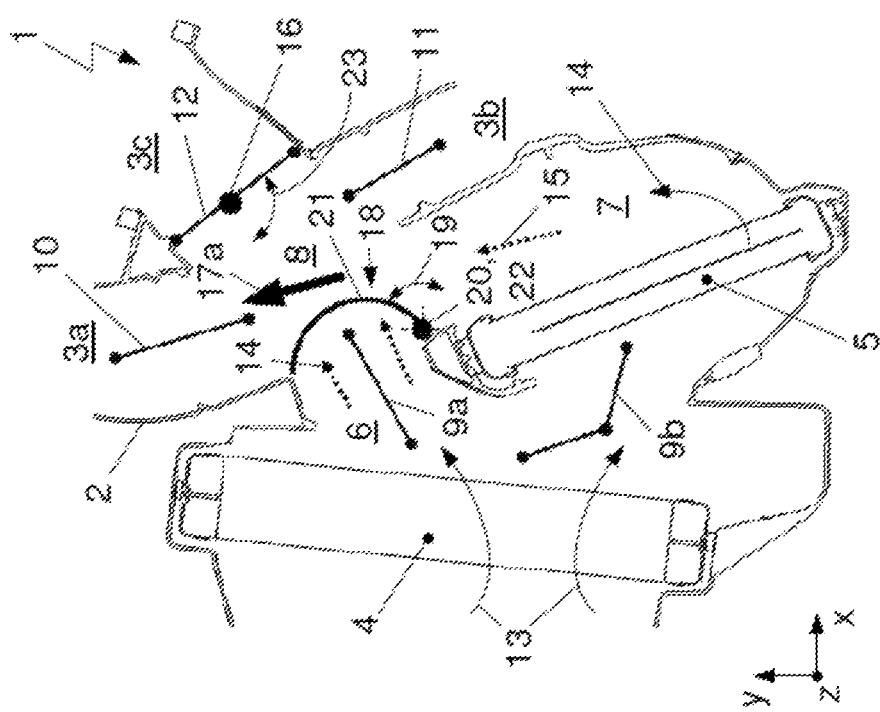

FIGS. 3A and 3B show an air conditioning system 1 with a device 18 for air mixing with the air outlets 3*a*, 3*b*, 3*c* and corresponding air flaps 10, 11, 12 as well as a device 18 for air mixing, each time in an end position of the device 18. The device 18 may be presented as a rotatable door 18 for air mixing, as desired.

In FIG. 3A the air conditioning system 1 is shown in the operating mode "warm air at the windshield air outlet and at the foot space air outlet", in which the air mass flow conducted in the flow direction 15 through the warm air path 7, after mixing in the air mass flow conducted in the flow direction 14 through the cold air path 6, is taken in the main flow direction, that is, the flow direction 17*a*, to the windshield air outlet 3*a* and to the foot space air outlet 3*b*. The air outlets 3*a*, 3*b* are opened. The dashboard air outlet 3*c* is closed by the air flap 12.

In FIG. 3B, the air conditioning system 1 is shown in the operating mode "cold air at the dashboard air outlet", in which the air mass flow conducted in the flow direction 14 through the cold air path 6, after mixing in the air mass flow conducted in the flow direction 15 through the warm air path 7, is taken in the main flow direction, that is, the flow direction 17*b*, to the dashboard air outlet 3*c*. The air flap 12 of the dashboard air outlet 3*c* is situated in the opened position of the air outlet 3*c*.

The device 18 for air mixing depending on the operating mode of the air conditioning system 1 serves basically to narrow the cross section of the particular flow duct 6, 7.

The device 18 for air mixing is mounted so as to turn in a direction of rotation 19 about an axis of rotation 20 between two end positions and is configured with air resistance elements 21. The air resistance elements 21 configured as flow resistances inside the air mass flow are rigidly joined to each other by a shaft 22 extending in the direction of the axis of rotation 20.

The air resistance elements 21 in the shape of a circular arc, resulting from the plane subtended in the horizontal direction x and in the vertical direction y, each extend in the depth direction z, while the air resistance elements 21 are arranged at such a spacing from each other that the cross section of the respective duct is only narrowed.

With the circular arc configuration of the air resistance elements 21 the working zone of the rotary mounted temperature flap 9*a* is advantageously kept clear and thus achieves an optimization of the structural space. In an alternative configuration and arrangement of the temperature flaps, for example when the temperature flap is configured as a sliding flap, the air resistance elements could be uncurved and consequently fashioned as a straight surface.

In the first end position per FIG. 3A the device 18 for air mixing with the air resistance elements 21 is arranged such that the cold air path 6 is reduced in cross section. In the second end position per FIG. 3B the device 18 with the air resistance elements 21 is oriented to slightly decrease the cross section of the warm air path 7. The device 18 can turn continuously between the two end positions.

The air flap 12 of the dashboard air outlet 3*c* mounted to turn about the axis of rotation 16 in the direction of rotation 23 and the device 18 for air mixing mounted about the axis of rotation 20 in the direction of rotation 19 are coupled together by connection elements, such as a common drive unit. In the first end position of the device per FIG. 3A, the air flap 12 is oriented to close the air outlet 3*c*. In the second end position of the device 18 per FIG. 3B, the air flap 12 is arranged to open the air outlet 3*c*. The connection elements are preferably designed so that the device 18 and the air flap 12 are each brought at the same time into the respective end positions.

According to one alternative design, both the device 18 for air mixing and the air flaps 10, 11, 12 have a separate drive unit. The drive units here are coupled together, so that the movement or turning of the device 18 and the air flaps 10, 11, 12 occur at the same time. The preferred couplings in different operating modes are summarized in the table below.

In regard to the incidental flow surface, the air resistance elements 21 are convex or concave, depending on the direction of incident flow. In the first end position of the device 18 per FIG. 3A, the air resistance elements 21 are essentially bathed in a flow of cold air on the concave side, which is oriented in the direction of the cold air path 6, in the flow direction 14. In the second end position of the device 18 per FIG. 3B, the air resistance elements 21 are bathed in warm air from the warm air path 7 on the convex side, which is oriented in the direction of the warm air path 7, in the flow direction 15.

The axis of rotation 20 of the device 18 for air mixing is arranged at the transition and thus at the margin or outside of the flow paths 6, 7. When the device 18 is oriented in the first end position per FIG. 3A, the air resistance elements 21 decrease the flow cross section of the cold air path 6, so that the air mass flow moving in the flow direction 14 through the cold air path 6 is swirled upon entering the mixing chamber 8 and thereby optimally mixed with the air mass flow moving through the warm air path 7. In the flow direction 15 of the warm air there is almost no flow obstacle in the form of air deflectors or the like. The warm air arriving from the flow direction 15 strikes the incident flow surface of the air resistance elements 21, which is convex curved for streamlining advantage.

When the device 18 for air mixing is oriented in the second end position per FIG. 3B, the air resistance elements 21 decrease the flow cross section of the warm air path 7, so that the air mass flow moving in the flow direction 15 through the warm air path 7 is swirled upon entering the mixing chamber 8 and thus optimally mixed with the air mass flow moving through the cold air path 6. In the flow direction 14 of the cold air there is no flow obstacle in the form of air deflectors or the like. The cold air arriving from the flow direction 14 moves within the main flow indicated by broken lines in the flow direction 17b from the cold air path 6 to the air outlet 3c. The device 18 is arranged with the air resistance elements 21 in the transition zone from the warm air path 7 to the mixing chamber 8, outside of the main flow, and does not affect the air flow.

In the operating mode "warm air at the windshield air outlet and/or at the foot space air outlet" of the air conditioning system 1 represented in FIG. 3A, the temperature flap 9a can be arranged to close the cold air path 6 and the temperature flap 9b to open the warm air path 7, so that the overall air mass flow drawn into the housing 2 is taken through the warm air path 7 to the opened air outlets 3a, 3c. These arrangements constitute the main operating modes for rapid vehicle warm-up. This accomplishes a high delivery of warm air through a free warm air path 7.

The device 18 for air mixing is arranged with the air resistance elements 21 essentially outside the air mass flows or parallel to the main flow direction, especially to the flow direction 17a.

In the operating mode "cold air at the dashboard air outlet" of the air conditioning system 1 represented in FIG. 3B as well as in the operating mode "cold air at the windshield outlet", not shown, the temperature flap 9a can be arranged to open the cold air path 6 and the temperature flap 9b to close the warm air path 7, so that the overall air mass flow delivered by the housing 2 is taken essentially without flow obstacle through the cold air path 6 to the air outlet 3c and the air outlet 3a, respectively. These arrangements correspond, for example, to the main operating modes for rapid cooldown of the passenger compartment. This accomplishes a high delivery of cold air through a free cold air path 6.

The device 18 for air mixing is arranged with the air resistance elements 21 outside the air mass flow and parallel to the main flow direction, especially to the flow direction 17b. In the operating modes not shown in FIG. 3A or FIG. 3B with opened windshield air outlet 3a and opened foot space air outlet 3b as well as dashboard air outlet 3c closed by the air flap 12, with opened foot space air outlet 3b and opened dashboard air outlet 3c as well as windshield air outlet 3a closed by the air flap 10 with opened windshield air outlet 3a and opened dashboard air outlet 3c as well as foot space air outlet 3b closed by the air flap 11 or with opened windshield air outlet 3a and opened foot space air outlet 3b as well as dashboard air outlet 3c the device 18 for air mixing is advantageously arranged with the air resistance elements 21 each time in one of the two end positions per FIG. 3A or FIG. 3B.

The following table summarizes the predominant positions of the air flaps 10, 11, 12 and the device 18 with the air resistance elements 21 depending on the particular operating mode.

| Operating mode | Primary position of air flaps | | | Preferred position of device 18 |
|---|---|---|---|---|
| | Air flap 10 | Air flap 11 | Air flap 12 | |
| Warm air outlet 3a (main operating mode) | open | closed | closed | end position 1 (FIG. 3A) |
| Warm air outlet 3b (main operating mode) | closed | open | closed | end position 1 (FIG. 3A) |
| Cold air outlet 3c (main operating mode) | closed | closed | open | end position 1 (FIG. 3B) |
| Venting of air outlets 3a and 3b (mix mode) | open | open | closed | end position 1 or 2 (FIG. 3A or 3B) |
| Venting of air outlets 3b and 3c (mix mode) | closed | open | open | end position 1 or 2 (FIG. 3A or 3B) |
| Venting of air outlets 3a and 3c (mix mode) | open | closed | open | end position 1 or 2 (FIG. 3A or 3B) |
| Venting of air outlets 3a, 3b, 3c (mix mode) | open | open | open | end position 1 or 2 (FIG. 3A or 3B) |

Figure 4:
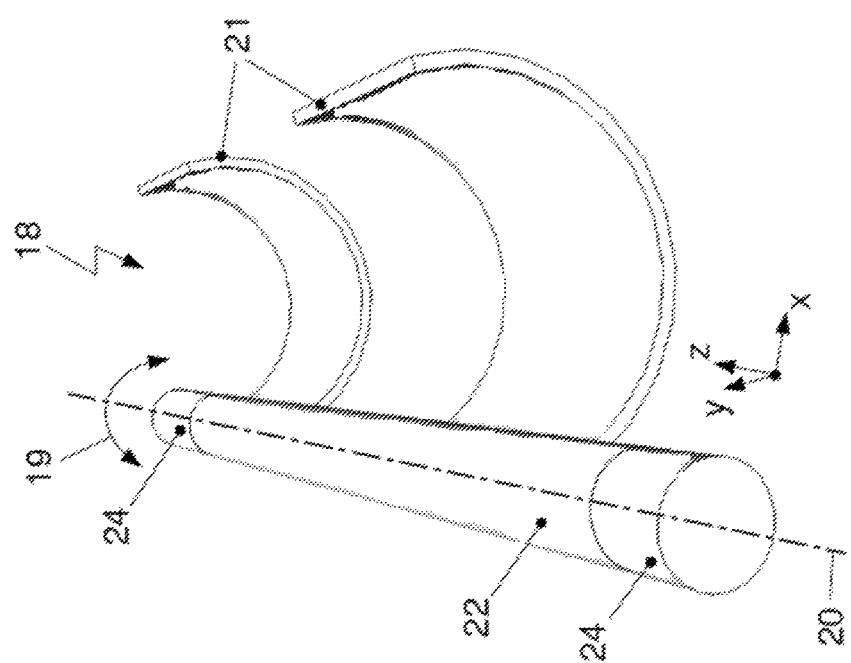
FIG. 4: the device for air mixing with air resistance elements in perspective view.

FIG. 4 shows the device 18 for air mixing in perspective view with the air resistance elements 21 as elements for intensifying the air mixing. The air resistance elements 21 are arranged flush with one another and staggered about a common axis of rotation 20 in the direction of the axis of rotation 20. The air resistance elements 21 are fashioned with a flat surface, curved about a center axis, with four side edges. The curved surface subtends a definite angle range.

The air resistance elements 21 arranged with one front side directly on the shaft 22 are rigidly supported on a shaft 22 oriented in the direction of the axis of rotation 20 and joined together by means of the shaft 22.

The air resistance elements 21 in the form of a circular arc in relation to the cross section resulting from the plane subtended in the horizontal direction x and in the vertical direction y are arranged at a spacing from each other in the depth direction z, so that free spaces are formed between the air resistance elements 21. The air resistance elements 21 have the same length in the direction of the axis of rotation 20 and in the depth direction z. The incident flow surfaces subtended by the air resistance elements 21 and the walls directed against the respective air mass flow and fashioned with a defined angle range are the same size and can be provided with additional profiles or openings to deflect or let through the air mass flow.

According to one alternative embodiment, not shown, the air resistance elements 21 can differ for example in length in the depth direction z and/or in the definite angle range. The shaft 22 has a bearing element 24 at the ends. The bearing elements 24 are fashioned as cylindrical journals. The axis of rotation 20 and the axes of the bearing elements 24 are congruent.

LIST OF REFERENCE SYMBOLS

1, 1', 1" Air conditioning system
2 Housing
3a Windshield air outlet
3b Foot space air outlet
3c Dashboard air outlet
4 Evaporator
5 Heating heat exchanger
6 Flow path, Cold air path
7 Flow path, Warm air path
7a Warm air duct
8 Mixing chamber
9a, 9b Temperature flap
10 Air flap, windshield air outlet 3a
11 Air flap, foot space air outlet 3b
12, 12' Air flap, dashboard air outlet 3c
13 Flow direction of air
14 Flow direction of air in the cold air path 6
15 Flow direction of air in the warm air path 7
16, 16' Axis of rotation of the air flap 12, 12'
17a, 17b Flow direction of conditioned air mass flow
18 Air mixing device
19 Direction of rotation of the air mixing element 18
20 Axis of rotation of the air mixing element 18
21 Air resistance element
22 Shaft
23 Direction of rotation of air flap 12
24 Bearing element
x horizontal direction
y vertical direction
z depth direction

The invention claimed is:
1. An arrangement for air distribution of an air conditioning system (1) of a motor vehicle, the arrangement comprising:
a housing (2) with at least two flow paths (6, 7) which empty into a mixing chamber (8), at least one air outlet (3a, 3b, 3c), at least one air flap (10, 11, 12) which can open and close the at least one air outlet (3a, 3b, 3c);
a door (18) for air mixing including at least one air resistance element (21 supported to turn about an axis of rotation (20) and extending in a direction of the axis of rotation (20), wherein the at least one air resistance element (21) is configured with at least one flow through opening so that depending on a position of the door (18), a cross section of at least one of the at least two flow paths (6, 7) of the housing (2) can be changed, and wherein the door (18) is configured to be coupled via connection elements to at least one of the at least one air flap (10, 11, 12) so a position of the at least one air resistance element (21) is changed with a movement of the at least one air flap (10, 11, 12), wherein the door (18) includes a shaft (22) having a longitudinal axis coinciding with the axis of rotation (20), wherein each of the at least one air resistance elements (21) includes a cross-sectional shape of a segment of a circle with an end of the segment of the circle intersecting the shaft (22) of the door (18), and wherein a radius of curvature of each of the at least one air resistance elements (21) is defined by an axis arranged parallel to and spaced apart from the axis of rotation (20).

2. The arrangement according to claim 1, wherein the at least one air resistance element (21) and the at least one air flap (10, 11, 12) are coupled together wherein the air resistance element (21) is arranged in a first end position changing the cross section of the at least one of the at least two flow paths (6), while one of the at least one air flap (12) is arranged primarily closing one of the at least one air outlet (3c), and in a second end position the air resistance element (21) is arranged not changing the cross section of the at least one of the at least two flow paths (6), while the one of the at least one air flap (12) is arranged opening the one of the at least one air outlet (3c).

3. The arrangement according to claim 2, wherein there are three air flaps (10,11, 12) and three air outlets (3a, 3b, 3c), wherein the air resistance element (21) in the first end position is arranged not changing the cross section of a second one of the at least two flow paths (7), while at least one of other of the air flaps (10, 11) is arranged opening at least one of other of the air outlets (3a, 3b), and in the second end position the air resistance element (21) is arranged changing the cross section of the second one of the at least two flow paths (7), while the at least one of other of the air flaps (10, 11) is arranged closing the at least one of other of the air outlets (3a, 3b).

4. The arrangement according to claim 1, wherein the at least one air resistance element (21) of the door (18) includes four side edges oriented perpendicular to the longitudinal axis of the shaft (22), and wherein one of the side edges is a front side and is disposed directly on the shaft (22) and rigidly joined to the shaft (22).

5. The arrangement according to claim 1, wherein the door (18) has a plurality of air resistance elements (21) spaced apart from each other in the direction of the axis of rotation (20) so a free space is formed between the plurality of air resistance elements (21) as a through flow opening.

6. An air conditioning system (1) for a motor vehicle with means of delivering, cooling and heating of air, the air conditioning system comprising:
a housing (2) with at least two flow paths (6, 7) which empty into a mixing chamber (8), wherein an air mass flow taken through a first one of the at least two flow paths (6) has a first temperature and an air mass flow taken through a second one of the at least two flow paths (7) has a second temperature,
air outlets (3a, 3b, 3c), wherein the air mass flow taken through a first one of the at least two flow paths (6) and the air mass flow taken through a second one of the at least two flow paths (7) can be guided by the at least two flow paths (6, 7) and the mixing chamber (8) to the air outlets (3a, 3b, 3c), and wherein a cross section of at least one of the at least two flow paths (6, 7) of the housing (2) can be changed, and
a door (18) for air mixing having air resistance elements (21) supported to turn about an axis of rotation (20), the door (18) including a shaft (22) having a longitudinal axis coinciding with the axis of rotation (20), wherein each of the air resistance elements (21) includes a cross-sectional shape of a segment of a circle with an end of the segment of the circle intersecting the shaft (22) of the door (18), and wherein a radius of curvature of each of the air resistance elements (21) is defined by an axis arranged parallel to and spaced apart from the axis of rotation (20).

7. The air conditioning system (1) according to claim 6, wherein the air resistance elements (21) are arranged at a margin or an outside of an air mass flow through the mixing chamber (8) depending on a rotational position of the door (18) for air mixing and a position of the axis of rotation (20) of the door (18).

\* \* \* \* \*